United States Patent
Iustin (10) Patent No.: US 12,319,099 B2
(45) Date of Patent: Jun. 3, 2025

(54) TIRE FITTING SYSTEM AND A METHOD THEREIN FOR SENSOR DISCRIMINATION

(71) Applicant: VOLVO TRUCK CORPORATION, Gothenburg (SE)

(72) Inventor: Roman Iustin, Mölnlycke (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 45 days.

(21) Appl. No.: 18/178,911

(22) Filed: Mar. 6, 2023

(65) Prior Publication Data

US 2023/0286334 A1    Sep. 14, 2023

(30) Foreign Application Priority Data

Mar. 9, 2022  (EP) .................................. 22161069

(51) Int. Cl.
*B60C 23/04*    (2006.01)

(52) U.S. Cl.
CPC ...... *B60C 23/0415* (2013.01); *B60C 23/0447* (2013.01); *B60C 2200/06* (2013.01)

(58) Field of Classification Search
USPC ....... 340/447, 449, 438, 442, 444, 457, 454, 340/466, 507, 527, 539.1, 539.13, 340/539.22–539.25, 568.1–568.8, 588, 340/614, 611, 626, 691.6
See application file for complete search history.

(56) References Cited

U.S. PATENT DOCUMENTS

| | | | |
|---|---|---|---|
| 2003/0030553 A1* | 2/2003 | Schofield | B60C 23/061 340/445 |
| 2003/0214395 A1 | 11/2003 | Flowerday et al. | |
| 2004/0164140 A1* | 8/2004 | Voeller | G07C 5/008 235/375 |
| 2005/0093539 A1* | 5/2005 | Salfelner | B60C 23/0408 324/207.25 |
| 2005/0172707 A1* | 8/2005 | Kanatani | B60C 23/0433 73/146 |
| 2012/0161955 A1* | 6/2012 | Togawa | B60C 23/0474 340/442 |
| 2015/0239306 A1* | 8/2015 | Bracq | B60C 23/0462 702/140 |
| 2015/0273955 A2* | 10/2015 | Hammer | B60C 23/0479 340/447 |
| 2017/0174013 A1* | 6/2017 | Fenkanyn | B60C 19/00 |

(Continued)

OTHER PUBLICATIONS

Extended European Search Report in corresponding European Application No. 22161069.4 dated Aug. 11, 2022 (7 pages).

*Primary Examiner* — Daniel Previl
(74) *Attorney, Agent, or Firm* — Venable LLP; Jeffri A. Kaminski (57) ABSTRACT

A tire fitting system and a method for discriminating between tire sensors of a wheel to be assembled on a vehicle is provided. The tire fitting system comprising a processing circuitry configured to receive an identity of an RFID tag mounted on a rim, or in a tire, of a wheel. The processing circuitry is also configured to receive, from the at least two tire sensors, tire sensor signals comprising status information indicating how their respective tire sensor was activated. The processing circuitry is further configured to determine which identity of the at least two tire sensors is to be associated with the identity of the RFID tag based on the status information.

12 Claims, 5 Drawing Sheets

(56) References Cited

U.S. PATENT DOCUMENTS

2017/0203619 A1\* 7/2017 Gow ................... B60C 23/0483
2017/0225526 A1\* 8/2017 Tomakidi ........... G07C 9/00309
2021/0192910 A1\* 6/2021 Shakedd .................. H04B 5/48

\* cited by examiner

TIRE FITTING SYSTEM AND A METHOD THEREIN FOR SENSOR DISCRIMINATION

TECHNICAL FIELD

Embodiments herein relate in general to a sensor discrimination. In particular, embodiments herein relate to a tire fitting system and a method for discriminating between at least two tire sensors. Furthermore, the embodiments herein also relate to computer program products for performing the method and computer program product carrier.

BACKGROUND

In vehicles today, in particular heavy-duty vehicles such as semi-trailer vehicles or trucks for cargo transport, one or more central electronic control units, ECUs, may be implemented on-board the vehicle in order to read and collect sensor readings from various different types of wireless wheel sensors on-board the vehicle. In some cases, tire sensors may be located in or on the tires or rims on the wheels of the vehicle. The sensor data transmitted from these tire sensors may comprise, for example, tire pressure, tire temperature, tire deformation, the identity of the sensor, etc. These types of systems are conventionally referred to as Tire Pressure Monitoring Systems, TPMS, or Tire Health Systems, THS. TPMS/THS systems also normally employ Radio Frequency, RF, transmissions operating on specifically dedicated frequencies for transmitting its sensor data the on-board ECU or external sensor data receivers. In additional to such TPMS/THS systems, each tire and/or rim of a wheel may also have one or more integrated or mounted Radio Frequency Identification, RFID, sensors, i.e. RFID tags, for enabling identification of the specific tire and/or specific rim of a wheel. RFID also employs RF signals or transmissions, albeit on other dedicated frequencies.

However, there is a need to improve how wheels are fitted with a tire and properly associated to its tire sensors, particularly in a noisy environment comprising multiple transmitting tire sensors.

SUMMARY

It is an object of embodiments herein to provide a systems and method therein, along with computer program product and carrier, for enabling a determination of a wheel location for wheels on a vehicle that seeks to mitigate, alleviate, or eliminate all or at least some of the above-discussed drawbacks of presently known solutions.

According to a first aspect of embodiments herein, the object is achieved by a method performed by a tire fitting system for discriminating between tire sensors of a wheel to be assembled on a vehicle is provided. The method comprises receiving an identity of an RFID tag mounted on a rim, or in a tire, of a wheel. The method also comprise receiving, from the at least two tire sensors, tire sensor signals comprising status information indicating how their respective tire sensor was activated. The method further comprise determining which identity of the at least two tire sensors is to be associated with the identity of the RFID tag based on the status information.

By discriminating between tire sensor signals from tire sensors using the received status information in the tire sensor signals, it is possible to determine which of the tire sensor signals should be associated with the RFID tag, i.e. which tire sensor that is currently being worked on. Hence, any confusion in the tire fitting system about which tire sensor to associate with the RFID tag is eliminated. This means that, as a tire is to be fitted on the rim of a wheel by the tire fitting system, the correct tire sensor will unambiguously be associated with the correct RFID tag on the wheel. Hence, the process of fitting wheels with a tire and properly associate its tire/rim sensors is improved.

In some embodiments, the status information may indicate that the at least two tire sensors was activated by an RF signal or by a pressure change in the tire of the wheel. IN this case, an RF signal activation or a pressure change activation indicated in the status information from a tire sensor is used to determine whether or not the tire sensor is associated with the wheel that is currently being worked on by the tire fitting system.

In some embodiments, the method may further comprise determining which identity of the at least two tire sensors is to be associated with the identity of the RFID tag based on registered activation times of the at least two tire sensors. This advantageously allows the tire fitting system to further discriminate between RF transmissions received from different tire sensors, e.g. by checking the time stamp of the activation of the tire sensor, and thus ensure that the correct tire sensor is unambiguously associated with the correct RFID tag on the wheel. In this case, according to some embodiments, the activation time may be registered for a tire sensor when a tire sensor signal is received comprising status information indicating that the tire sensor was activated by a pressure change in the tire of the wheel.

In some embodiments, the tire sensor signals from the tire sensor are radio signals using one or more of 315, 433, 868, 915, 1900 or 2450 MHz. In some embodiments, the RF signal may be a 125 kHz-signal. In some embodiment, the RFID tag utilizes a 868 MHz frequency. These are examples of preferable frequency ranges for the different signals.

According to a second aspect of embodiments herein, the object is achieved by a tire fitting system for discriminating between tire sensors of a wheel to be assembled on a vehicle is provided. The tire fitting system comprise a processing circuitry configured to receive an identity of an RFID tag mounted on a rim, or in a tire, of a wheel. The processing circuitry is also configured to receive, from the at least two tire sensors, tire sensor signals comprising status information indicating how their respective tire sensor was activated. The processing circuitry is further configured to determine which identity of the at least two tire sensors is to be associated with the identity of the RFID tag based on the status information.

In some embodiments, the status information may indicate that the at least two tire sensors were activated by an RF signal or by a pressure change in the tire of the wheel.

In some embodiments, the processing circuitry may be configured to determine which identity of the at least two tire sensors is to be associated with the identity of the RFID tag based on registered activation times of the at least two tire sensors. In this case, according to some embodiments, the activation time may be registered for a tire sensor when a tire sensor signal is received comprising status information indicating that the tire sensor was activated by a pressure change in the tire of the wheel.

In some embodiments, the tire sensor signals from the tire sensor are radio signals using one or more of 315, 433, 868, 915, 1900 or 2450 MHz. In some embodiments, the RF signal may be a 125 kHz-signal. In some embodiment, the RFID tag utilizes a 868 MHz frequency. These are examples of preferable frequency ranges for the different signals.

According to a third aspect of the embodiments herein, the object is achieved by a computer program comprising instructions which, when executed in a processing circuitry, cause the processing circuitry to carry out the methods described above. According to a fourth aspect of the embodiments herein, the object is achieved by a carrier containing any of the computer program products described above, wherein the carrier is one of an electronic signal, optical signal, radio signal, or computer-readable storage medium.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description. It is to be understood that the present invention is not limited to the embodiments described herein and illustrated in the drawings; rather, the skilled person will recognize that many changes and modifications may be made within the scope of the appended claims.

Figure 1:
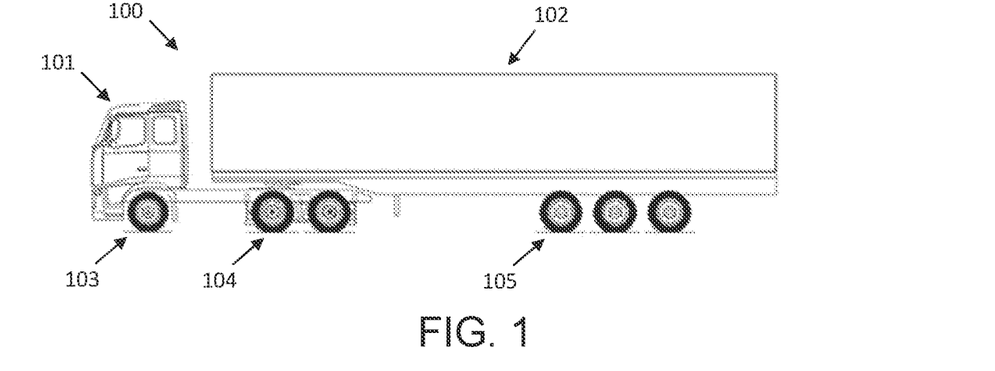
FIG. 1 is a side view of a vehicle.

FIG. 1 illustrates an example of a vehicle 100. In this case, the vehicle 100 is exemplified as a heavy-duty vehicle combination for cargo transport, i.e. a truck/towing vehicle 101 configured to tow a trailer unit 102 in a known manner, e.g. by a fifth wheel connection. The vehicle 100 comprises wheels 103, 104, and 105. It should be noted that with the term heavy-duty vehicle herein is meant a vehicle designed for the handling and transport of heavier objects or large quantities of cargo. The term heavy-duty vehicle may, however, also refer to a vehicle designed for use in construction, mining operations, or similar, such as, a working or construction machine. It should also be noted that even though the embodiments herein for enabling a determination of a location of a tire sensor on a chassis of a vehicle are described mainly with respect to a heavy-duty vehicle, such as, the heavy-duty vehicle combination 101, 120 in FIG. 1, the embodiments herein should not be considered restricted to this particular type of vehicle but may also be used in other types of vehicles, such as, passenger cars, commercial vehicles, busses, etc.

Figure 2:
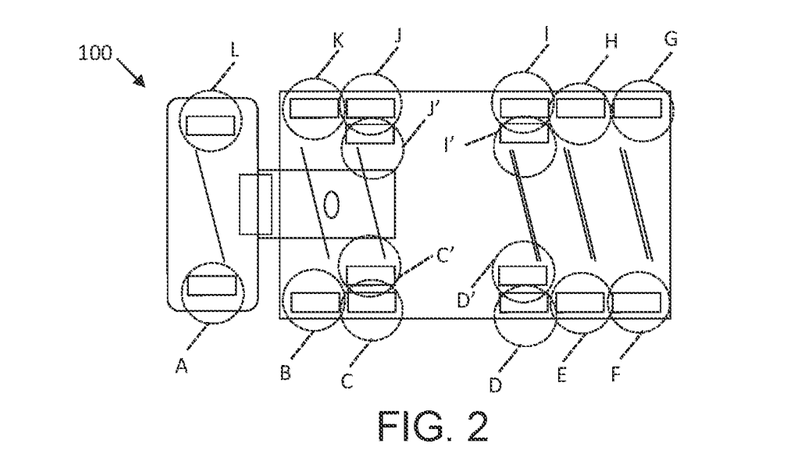
FIG. 2 is a schematic illustration of a vehicle and wheel locations thereon.

FIG. 2 illustrates a first top-side view of the vehicle 100 and wheel positions A-L thereon. In this example, the wheel position A is the front left wheel position of the truck or towing vehicle 101 of the vehicle 100, while the wheel position L is the front right wheel position of the truck or towing vehicle 101 of the vehicle 100. Furthermore, the wheel positions of the trailer unit 102 ranges around the trailer unit 102 from the wheel position B for the front left wheel of the trailer unit 102 to the wheel position K of the front right wheel of the trailer unit 102. In some cases, certain wheel positions may comprise a set of twin wheels as illustrated for the wheel positions C, D, I, and J. In this case, the outermost wheel position of the set of twin wheels is referred to as C, D, I, and J, respectively, while the innermost wheel position of the set of twin wheels is referred to as C', D', I', and J'. It should also be noted that the notation of the wheel positions is merely made for sake of illustrative purposes to provide a clear and concise references to different wheel positions; in other words, this notation should not be construed as limiting to the embodiments herein.

Figure 3:
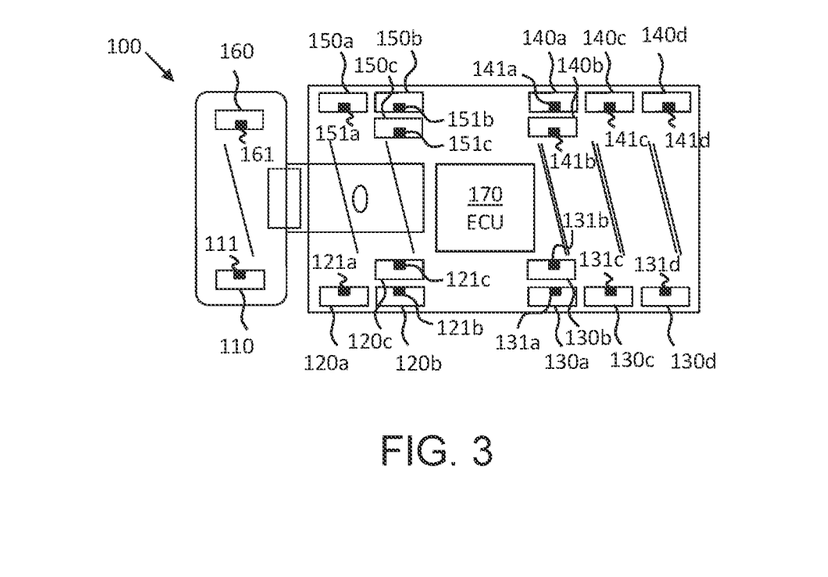
FIG. 3 is a schematic illustrations of a vehicle having tires with tire sensors at each wheel location.

FIG. 3 illustrates a second top-side view of the vehicle 100 having wheels 110, 120, 130, 140, 150, 160 comprising tire sensors 111, 121, 131, 141, 151, 161 at each wheel position A-L on the vehicle 100 as described above in FIG. 2. The vehicle 100 further comprise an electronic control unit, ECU 170. In this example, the wheel 110 at the wheel position A of the truck or towing vehicle 101 of the vehicle 100 comprise at least one tire sensor 111, while the wheel 120 at the wheel position L of the truck or towing vehicle 101 of the vehicle 100 comprise at least one tire sensor 121. Similarly, each wheel 120a, 120b, 120c at the two front left wheel positions B, C, C' of the trailer unit 102 of the vehicle 100 comprise each at least one tire sensor 121a, 121b, 121c, respectively. Also, each wheel 130a, 130b, 130c, 130d at the three back left wheel positions D, D', E, F of the trailer unit 102 of the vehicle 100 comprise each at least one tire sensor 131a, 131b, 131c, 131d, respectively. Furthermore, each wheel 140a, 140b, 140c, 140d at the three back right wheel positions I, H, G of the trailer unit 102 of the vehicle 100 comprise each at least one tire sensor 141a, 141b, 141c. Lastly, each wheel 150a, 150b, 150c at the two front right wheel positions K, J, J' of the trailer unit 102 of the vehicle 100 comprise each at least one tire sensor 151a, 151b, 151c. The ECU 170 and each of the one or more tire sensors 111, 121, 131, 141, 151, 161 on the vehicle 100 may be part of an on-board Tire Pressure Monitor System/Tire Health System, TPMS/THS. In other words, the one or more tire sensors 111, 121, 131, 141, 151, 161 on the vehicle 100 may be TPMS/THS sensors, and the ECU 170 may be a TPMS/THS sensor reader. The one or more tire sensors 111, 121, 131, 141, 151, 161 on the vehicle 100 may also be referred to as TPMS/THS transponders, tire pressure sensors, or tire pressure and temperature sensors. Furthermore, each tire and/or rim of each of the wheels 110, 120, 130, 140, 150, 160 may also have one or more integrated or mounted Radio Frequency Identification, RFID, sensor, i.e. RFID tag. The RFID tags (not shown) enable identification of the specific tire and/or specific rim of each of the wheels 110, 120, 130, 140, 150, 160 using radio frequency transmissions.

As part of the developing of the embodiments described herein, it has been realized that, for example, during pairing of tire sensors and RFIDs for a wheel at a tire fitment station, once a tire is inflated, the tire sensor inside of the tire will get activated and start a scheduled broadcasting. However, several different wheels all around the tire fitment station may send their tire sensor readings simultaneously, which all then may be registered by a receiver. In order to obtain a correct pairing, a tire fitting system needs to be able to discriminate the around sensors and only use the sensor being currently fitted inside the wheel. Consequently, in order to, for example, be able to determine at which wheel position A, B, C, D, E, F, G, H, I J K, L each of the one or more tire sensors 111, 121, 131, 141, 151, 161 and RFID tags of the tire and/or rim of the wheels 110, 120, 130, 140, 150, 160 are located, it is important each of the one or more tire sensors 111, 121, 131, 141, 151, 161 and RFID tags are properly associated. This may, as described above, be particularly difficult in a noisy environment comprising multiple transmitting tire sensors, such as, e.g. in a tire fitment centre, station or workshop. This problem is addressed by the embodiments described herein.

Figure 4:
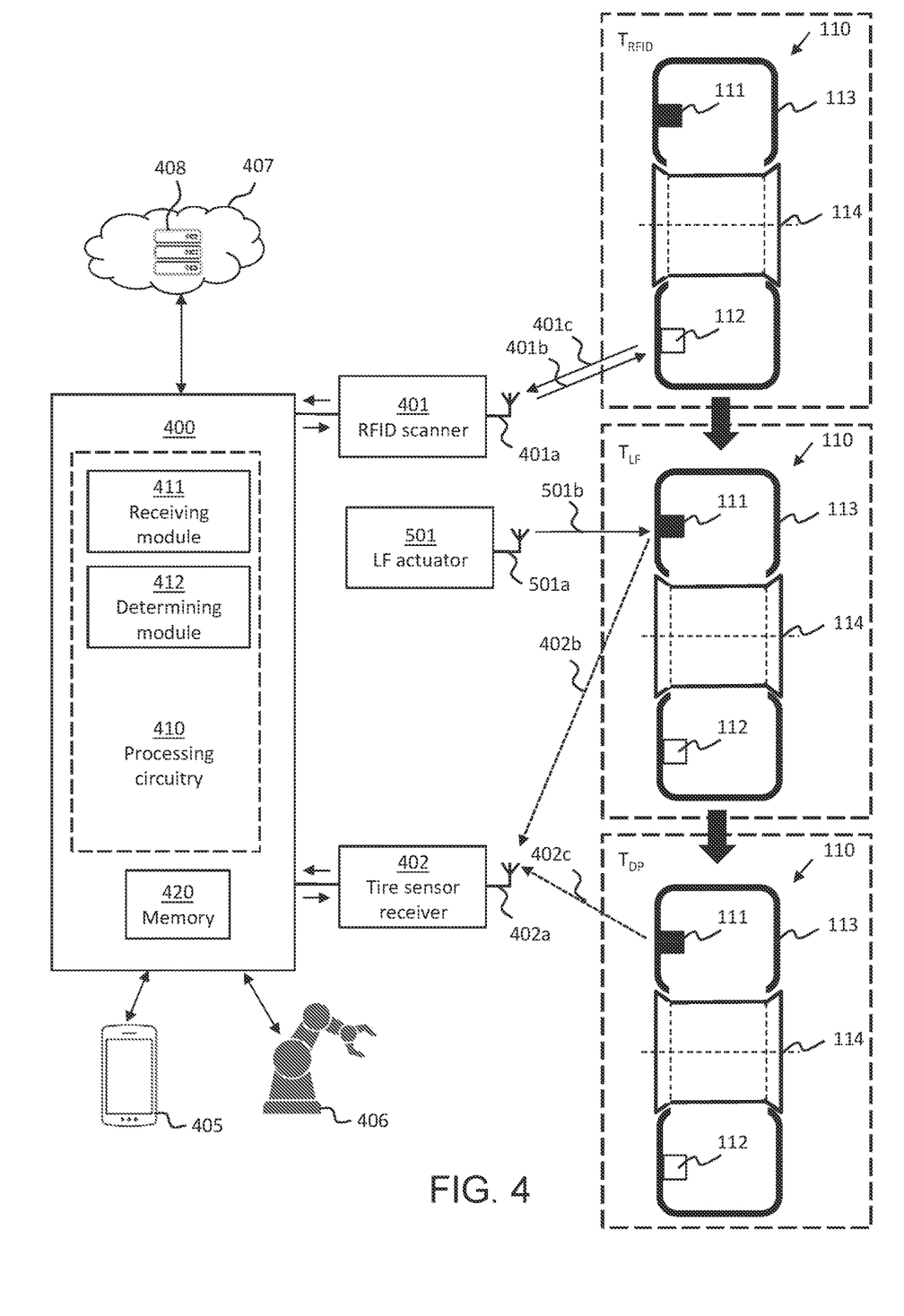
FIGS. 4-6 are a schematic illustrations of a tire fitting system according to some embodiments.
Figure 5:
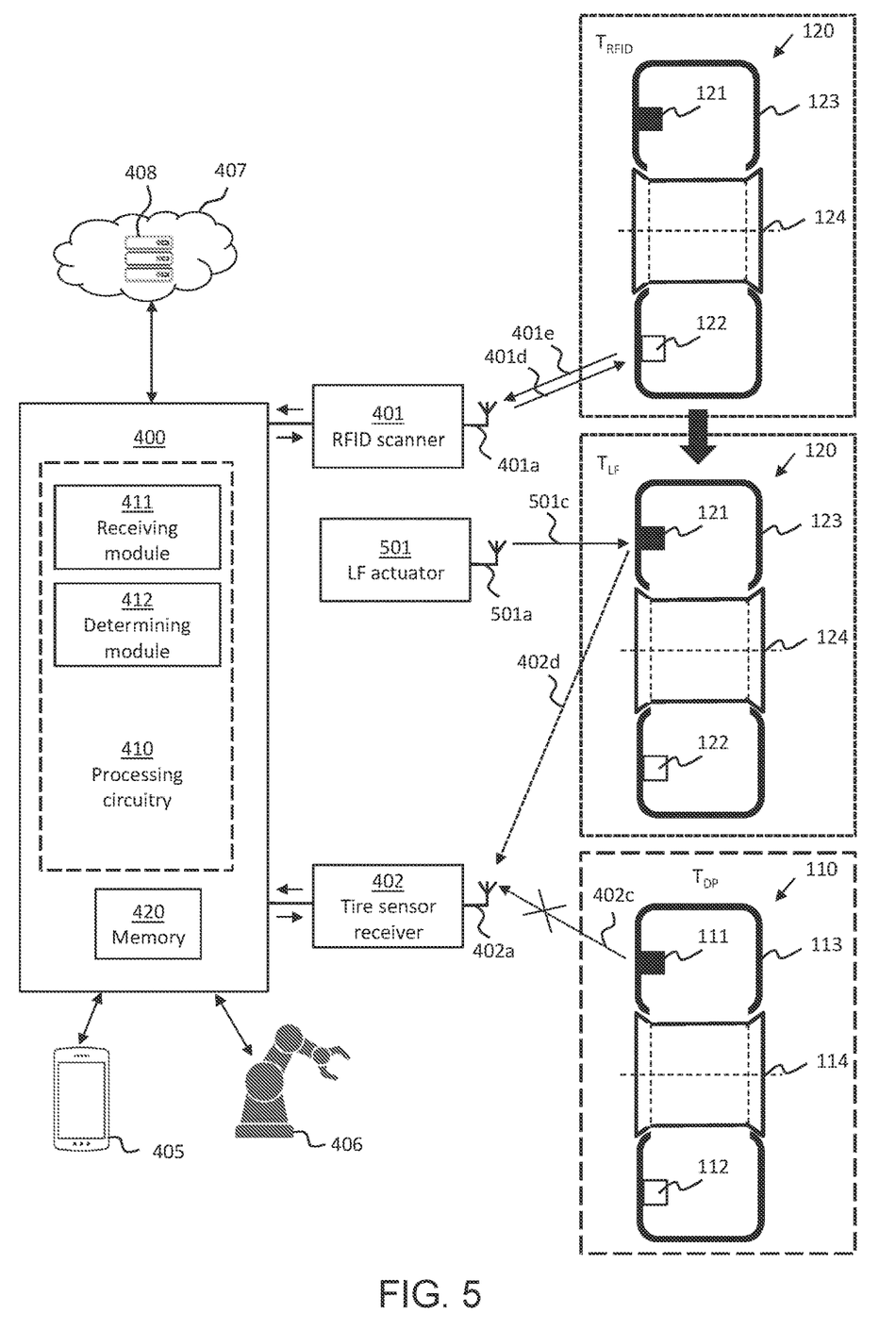
Figure 6:
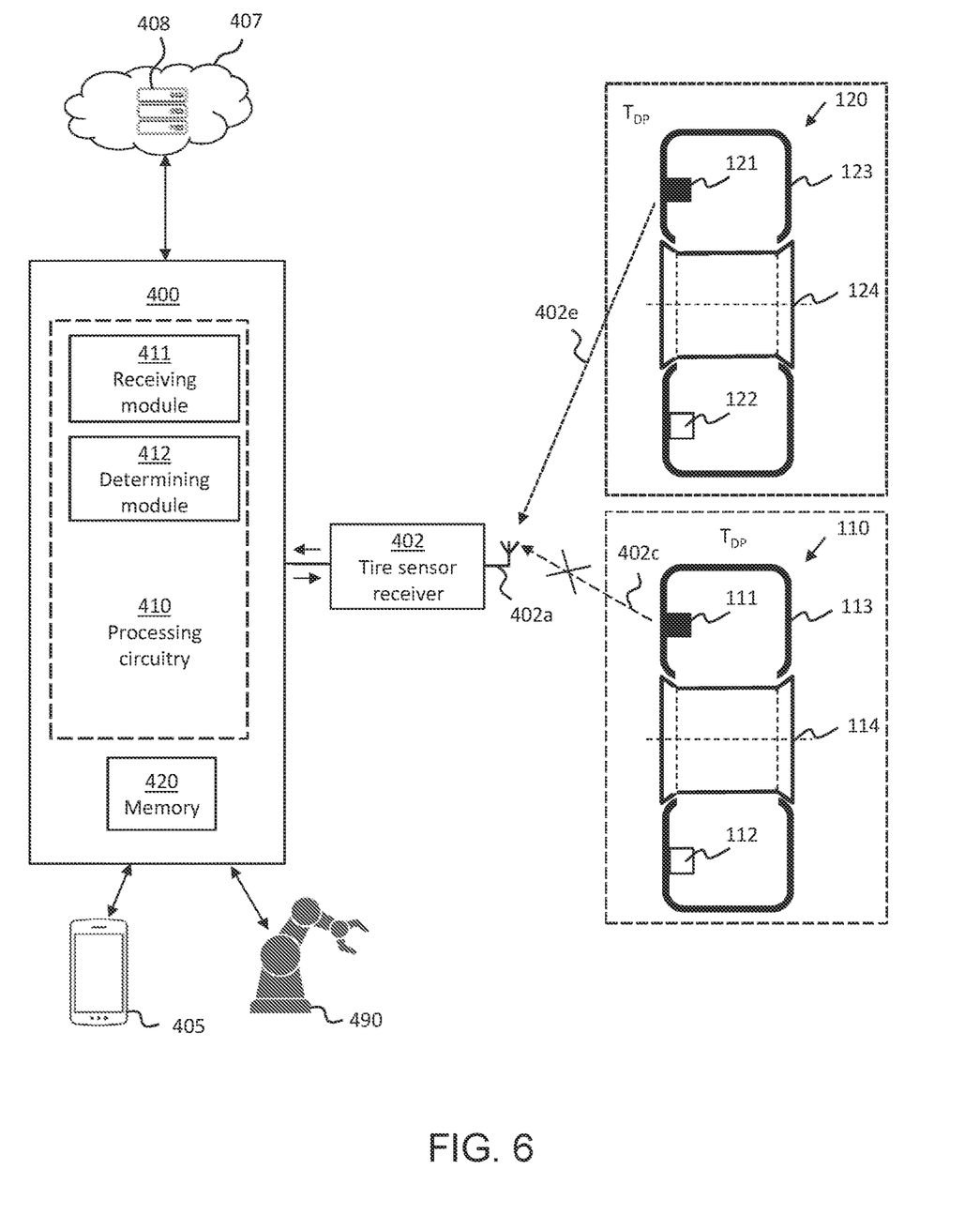

FIGS. 4-6 shows a schematic illustration of a tire fitting system 400 for discriminating between at least two tire sensors 111, 121 of a wheel 110, 120 to be assembled on a vehicle 100 according to some embodiments. It should be noted that, although not shown in FIGS. 4-6, known conventional features of the tire fitting system 400, such as, for example, a power source, e.g. a battery or main connection, may be assumed to be comprised in the tire fitting system 400.

The tire fitting system 400 may comprise, or be arranged to be connected to and configured to communicate with, an RFID scanner 401. The RFID scanner 401 may be configured to scan for RFID tags, such as, e.g. the RFID tag 112, 122 in the tire 113, 123. The RFID scanner 401 may comprise an antenna 401a for transmitting and receiving RFID signals from RFID tags, such as, e.g. the RFID tag 112, 122 in the tire 113, 123. The RFID signal may, for example, be an RFID interrogation signal and/or a generated electromagnetic field configured to trigger a RFID response from the RFID tag. The RFID tag may, for example, utilize the 868 MHz frequency band. For example, in FIG. 4, as the RFID tag 112 receives the RFID signal 401b from the RFID scanner 401, the RFID tag 112 will respond with a RFID response signal 401c comprising the identity of the RFID tag. In other words, the RFID scanner 401 may receive a RFID response signal from the RFID tag 112 in response to the RFID tag 112 receiving its transmitted RFID signal 401b. The tire fitting system 400 may also comprise, or be arranged to be connected to and configured to communicate with, a tire sensor receiver 402. The tire sensor receiver 402 may be configured to receive or read tire sensor signals transmitted from tire sensors in a tire of a wheel prior to the wheel being assembled on the vehicle, such as, e.g. the tire sensor 111, 121. The tire sensor receiver 402 may be a TPMS/THS system receiver in case the tire sensor is a TPMS/THS sensor. The tire sensor receiver 402 may comprise an antenna 402a for receiving tire sensor signals from tire sensors, e.g. the tire sensor signals 402b-402e from the tire sensors 111, 121 in FIGS. 4-6. Here, it should also be noted that tire sensors are normally scheduled to send frames of information in its tire sensor signals, such as, e.g. supplier identity, sensor identity, pressure info, temperature info, status information, etc. Depending on the mode of operation of the tire sensor, frames may be sent in different ways. Also, since the tires sensors conventionally are battery-powered sensors, the tire sensors are configured in an off-mode prior to fitment inside a wheel. This in order to save battery lifetime. Hence, the tire sensors needs to be activated in order to transmit its tire sensor signals.

As shown in FIGS. 4-6, according to some embodiments, the tire sensor 111 may be activated by a Low-Frequency, LF, actuator 501. The LF actuator 501 may comprise an antenna 501a configured to transmit a LF signal 501b, 501c, e.g. a low-frequency magnetic field using 125 kHz, causing the tire sensor 111, 121 to be activated and transmit a tire sensor signal 402b, 402d. Here, it should be noted that this type of LF signal 501b, 501c is normally used to in a controlled way make the tire sensors send a limited number of frames, e.g. for diagnostics or quick checks during production. The LF signal 501b, 501c normally has a very short range, e.g. up to 30 cm.

Furthermore, the tire sensor 111, 121 may optionally be activated by a delta pressure, DP, occurring in the tire 113, 123, i.e. a pressure difference. For example, as the tire 113, 123 is being inflated on the rim 114, 124 of the wheel 110, 120, the tire 113, 123 will conventionally be provided with a recommended pressure, usually about 8-10 bars. As the tire sensor 111, 121 usually have a programmed threshold pressure level after which it gets activated, e.g. from 2 bars and above, the tire sensor 111, 121 will sense the change in pressure and become activated, and thus transmit the tire sensor signal 402c, 402d. Here, it should be noted that if the tire sensor 111, 121 is activated by means of a LF signal 501b, 501c or by a delta pressure, the tire sensor signals 402b, 402c, 402d, 402e will comprise a frame carrying this status information. In FIG. 4, for example, if the tire sensor 111 has been activated by a LF signal 501b from the LF actuator 501, the frame in the tire sensor signal 402b may comprise "LF" to indicate how the tire sensor 111 was activated. Optionally, if the tire sensor 111 has been activated by the event of a delta pressure, the frame in the tire sensor signal 402c may comprise "DP" to indicate how the tire sensor 111 was activated.

According to some embodiments, the tire fitting system 400 may also comprise, or be arranged to be connected to and communicate with, a display 405 and/or an automated tire fitting station 406. The display 405, or display interface, may be used by the tire fitting system 400 to communicate with an operator of the system 400. The automated tire fitting station 406 may be arranged to automatically fit and inflate a tire 113 on a rim 114 of the wheel 110. Additionally, the system 400 may also comprise, or be arranged to be connected to and configured to communicate with, a database server or cloud service 408 in a connected or remote network 407 for digital information storage.

The tire fitting system 400 further comprise a processing circuitry 410 and a memory 420. It should also be noted that some or all of the functionality described in the embodiments herein as being performed by the tire fitting system 400 may be provided by the processing circuitry 410 executing instructions stored on a computer-readable medium, such as, the memory 420 shown in FIGS. 4-6. Besides being arranged to communicate with the RFID scanner 401 and the tire sensor receiver 401, the processing circuitry 410 may further be arranged to communicate with the display 405 and/or automated tire fitting system 406. Furthermore, the processing circuitry 410 may further comprise additional components, such as, for example, a receiving module 411 and a determining module 413, each responsible for providing its functionality to support the embodiments described herein.

The tire fitting system 400 or processing circuitry 410 is configured to, or may comprise the receiving module 411 configured to, receive an identity of an Radio Frequency Identification, RFID, tag 112, 122 mounted on a rim 114, 124, or in a tire 113, 123, of a wheel 110, 120. Also, the tire fitting system 400 or processing circuitry 410 is configured to, or may comprise the receiving module 412 configured to, receive, from the at least two tire sensors 111, 121, tire sensor signals 402b, 402c, 402d, 402e comprising status information indicating how their respective tire sensor 111, 121 was activated. The tire fitting system 400 or processing circuitry 410 is further configured to, or may comprise the determining module 412 configured to, determine which identity of the at least two tire sensors 111, 121 is to be associated with the identity of the RFID tag 112, 122 based on the status information.

In some embodiments, the status information indicate that the at least two tire sensors 111, 121 was activated by an RF signal 501b, 501c or by a pressure change in the tire 113, 123 of the wheel 110. In some embodiments, the tire fitting system 400 or processing circuitry 410 may be configured to, or may comprise the determining module 412 configured to, determine which identity of the at least two tire sensors 111, 121 is to be associated with the identity of the RFID tag 112, 122 based on registered activation times of the at least two tire sensors 111, 121. In this case, according to some embodiments, the activation time may be registered for a tire sensor 111, 121 when a tire sensor signal 402b, 402c, 402d, 402e is received comprising status information indicating that the tire sensor 111, 121 was activated by a pressure change in the tire 113, 123 of the wheel 110, 120. In some embodiments, the tire sensor signals 402b, 402c, 402d, 402e from the tire sensor 111, 121 may be radio signals using one or more of 315, 433, 868, 915 or 2450 MHz, the RF signal 501b, 501c may be a radio signal using 125 kHz, and the RFID tag 112, 122 may utilize the 868 MHz frequency.

Furthermore, the embodiments for discriminating between at least two tire sensors 111, 121 of a wheel 110, 120 to be assembled on a vehicle 100 described above may be at least partly implemented through one or more processors, such as, the processing circuitry 410 in the tire fitting system 400 depicted in FIGS. 4-6, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 410 in the tire fitting system 400. The data carrier, or computer readable medium, may be one of an electronic signal, optical signal, radio signal or computer-readable storage medium. The computer program code may e.g. be provided as pure program code in the tire fitting system 400 or on a server and downloaded to the tire fitting system 400. Thus, it should be noted that the tire fitting system 400 may in some embodiments be implemented as computer programs stored in memory 420 in FIGS. 4-6, e.g. the computer readable storage unit/module, for execution by processors or processing modules, e.g. the processing circuitry 410 in the tire fitting system 400 in FIGS. 4-6.

Those skilled in the art will also appreciate that the processing circuitry 410 and the memory 420 described above may refer to a combination of analog and digital circuits, and/or one or more processors configured with software and/or firmware, e.g. stored in a computer readable storage unit/module, that when executed by the one or more processors such as the processing circuitry 410 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 7:
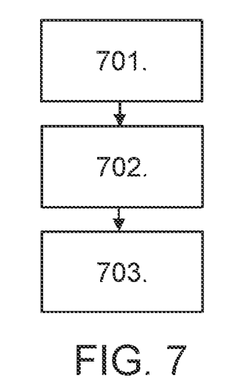
FIG. 7 is a flowchart illustrating embodiments of a method in a tire fitting system.

Further to illustrating the tire fitting system 400, FIGS. 4-6 also illustrates how the tire fitting system 400 may be used by an operator of the tire fitting system 400 according to the method described by the embodiments presented below with reference to FIG. 7.

In a first step at time $T_{RFID}$ as shown by the dashed area in FIG. 4, an operator of the tire fitting system 400 may start by picking up a tire 113 for the wheel 110. The operator may then use the RFID scanner 401 to scan and read the RFID tag 112 in the tire 113 of the wheel 110. In a second step at time $T_{LF}$ as shown by the dashed area in FIG. 4, the operator of the tire fitting system 400 may pick up a tire sensor 111 for mounting in the tire 113, and/or on the rim 114, of the wheel 110. Optionally, the tire sensor 111 may already be mounted in the tire 113, and/or on the rim 114, of the wheel 110. The operator may then use the LF actuator 501 to activate the tire sensor 111 causing the tire sensor 111 to send the tire sensor signal 402b to the tire sensor receiver 402 with the status information "LF" in its frame. Hence, the tire fitting system 400 becomes aware of that the tire sensor 111 is the tire sensor that is currently being worked on and establish an association with the RFID tag 112 for the wheel 110. This association also comprise the received status information from the tire sensor 111. In a third step at time $T_{DP}$ as shown by the dashed area in FIG. 4, the operator of the tire fitting system 400 may mount the tire sensor 111 on the tire 113 and/or rim 114 and then fit the tire 113 to the rim 114. As the tire 113 is inflated on the rim 114, the tire sensor 111 will activate itself and send the tire sensor signal 402c to the tire sensor receiver 402 with the status information "DP" in its frame. The tire fitting system 400 may then register or update the status information from "LF" to "DP" comprised in the association between the tire sensor 111 and the RFID tag 112. Furthermore, the tire fitting system 400 may also register the time when the tire sensor 111 got activated by the pressure change. This means that the operator of the tire fitting system 400 is finished with the wheel 110 and may put the wheel 110 on a shelf or other close-by storage until it is time to assemble the wheel 110 on the vehicle 100.

However, in fourth step at time $T_{RFID}$ as shown by the dotted area in FIG. 5, the operator of the tire fitting system 400 may continue by picking up a second tire for a second wheel to be fitted, e.g. the tire 123 for the wheel 120. As for the previous wheel 110, the operator may use the RFID scanner 401 to scan and read the RFID tag 122 in the tire 123 of the wheel 120, i.e. RFID signals 401d, 401e. In a fifth step at time $T_{LF}$ as shown by the dotted area in FIG. 5, the operator of the tire fitting system 400 may pick up a tire sensor 121 for mounting in the tire 123, and/or on the rim 124, of the wheel 120. The operator may then use the LF actuator 501 to transmit the LF signal 501c activating the tire sensor 121 causing the tire sensor 121 to send the tire sensor signal 402d to the tire sensor receiver 402 with the status information "LF" in its frame. One problem may here be that, as tire sensor receiver 402 receives the tire sensor signal 402d from the tire sensor 121, the tire sensor receiver 402 may also receive the tire sensor signal 402c from the tire sensor 111 from the wheel 110 that may still be transmitting from the shelf where the wheel 110 is stored, as shown by the dashed area in FIG. 5. It should here be noted that tire sensors operating in the 315/433 MHz or 868/915/2450 MHz frequency ranges normally has a range of up to 7-10 meters and may transmit its tire sensor signals intermittently for a period of time in accordance with a configured transmission configuration, e.g. once every 60 seconds for 10 minutes. This could cause a confusion as to which of the tire sensors 111, 121 is to be associated with the RFID tag 122. However, since the tire fitting system 400 is able to discriminate the tire sensor signal 402d having status "LF" from the tire sensor signal 402c having status "DP", the tire fitting system 400 is aware that the tire sensor 121 is the tire sensor that is currently being worked on and establish an association with the tire sensor 121 and the RFID tag 122 for the wheel 120.

In sixth step at time $T_{DP}$ as shown by the dotted area in FIG. 6, the operator of the tire fitting system 400 may mount the tire sensor 121 on the tire 123 and/or rim 124 and then fit the tire 123 to the rim 124. As the tire 123 is inflated on the rim 124, the tire sensor 121 will activate itself and send the tire sensor signal 402e to the tire sensor receiver 402 with the status information "DP" in its frame. One problem may here be that, as tire sensor receiver 402 receives the tire sensor signal 402e from the tire sensor 121, the tire sensor receiver 402 may also still receive the tire sensor signal 402c from the tire sensor 111 from the wheel 110 that may still be transmitting from the shelf where the wheel 110 is stored, as shown by the dashed area in FIG. 6. This could again cause a confusion as to which of the tire sensors 111, 121 is to be associated with the RFID tag 122. However, the tire fitting system 400 is here able to discriminate between the tire sensor signal 402e having status "DP" and the tire sensor signal 402c having status "DP" by checking the activation time registered for the tire sensor signal 402c, 402e. The tire sensor signal 402c will have an earlier activation time registered than the tire sensor signal 402e from the recently activated tire sensor 121. Thus, the tire fitting system 400 is aware that the tire sensor 121 is the tire sensor that is currently being worked on and may register or update the status information from "LF" to "DP" comprised in the association between the tire sensor 121 and the RFID tag 112. By this, the operator of the tire fitting system 400 is finished with the wheel 120 and may put the wheel 120 on a shelf or other close-by storage until it is time to assemble the wheel 120 on the vehicle 100.

Examples of embodiments of a method performed by a tire fitting system 400 for discriminating between at least two tire sensors 111, 121 of a wheel 110, 120 to be assembled on a vehicle 100, will now be described with reference to the flowchart depicted in FIG. 7. FIG. 7 is an illustrated example of actions, steps or operations which may be performed a tire fitting system 400 described above with reference to FIGS. 4-6. The method may comprise the following actions, steps or operations.

Action 701. The tire fitting system 400 receives an identity of a RFID tag 112, 122 mounted on a rim 114, 124, or in a tire 113, 123, of a wheel 110, 120. This may, for example, be performed by the RFID scanner 401 in FIGS. 4-6. Here, the RFID may, for example, utilize the 868 MHz frequency.

Action 702. The tire fitting system 400 may also receive from the at least two tire sensors 111, 121, tire sensor signals 402b, 402c, 402d, 402e comprising status information indicating how their respective tire sensor 111, 121 was activated. This may, for example, be performed by the tire sensor receiver 402 in FIGS. 4-6. Here, the tire sensor signals 402b, 402c, 402d, 402e from the tire sensor 111, 121 may, for example, be radio signals using one or more of 315, 433, 868, 915 or 2450 MHz. In some embodiments, the status information may indicate that the at least two tire sensors 111, 121 was activated by an RF signal 501b, 501c or by a pressure change in the tire 113, 123 of the wheel 110. Here, the RF signal 501b, 501c may, for example, be a radio signal using 125 kHz. The RF signal may, for example, be generated by the LF actuator 502 in FIGS. 4-6.

Action 703. After receiving the identity of the RFID tag 112, 122 in Action 701 and the tire sensor signals 402b, 402c, 402d, 402e of the at least two tire sensors 111, 121 in Action 702, the tire fitting system 400 determines which identity of the at least two tire sensors 111, 121 is to be associated with the identity of the RFID tag 112, 122 based on the status information. According to some embodiments, the tire fitting system 400 may also determine which identity of the at least two tire sensors 111, 121 is to be associated with the identity of the RFID tag 112, 122 based on registered activation times of the at least two tire sensors 111, 121. Here, an activation time may be registered for a tire sensor 111, 121 when a tire sensor signal 402b, 402c, 402d, 402e is received comprising status information indicating that the tire sensor 111, 121 was activated by a pressure change in the tire 113, 123 of the wheel 110, 120.

Additional Aspects

According to a first additional aspect of the embodiments described herein, it is also presented a method performed by a tire fitting system for discriminating between Radio Frequency Identification, RFID, tags. The method comprise detecting an RFID tag. The method also comprise comparing the identity of the RFID tag with a registered list of identities of RFID tags dedicated for a rim, or tire, of a wheel. The method further comprises rejecting the RFID tag if its identity do not match with any of the identities in the determined list of RFID tags. By having a list of pre-approved RFID tags, the tire fitting system is able to discriminate the RFID tags dedicated to a rim or a tire of a wheel from other detected RFID tags. One example of other RFID tags that may be detected by the tire fitting system is RFID tagged work-outfits of personnel in a tire fitment center, or assembly line of a factory, in which the tire fitting system is located. In this case, work-outfits of personnel may be equipped with RFID tags in order to facilitate and assist in cleaning and washing of the work-outfits. In some embodiments, the method may comprise registering all RFID tags of rims, or tires, of wheels to be fitted by the tire fitting system in a list of identities of RFID tags dedicated for a rim, or a tire, of a wheel. Optionally, the registered list of identities of RFID tags dedicated for a rim, or tire, of a wheel may be provided by the manufacturer and be made available to the tire fitting system.

According to a second additional aspect of the embodiments described herein, it is also presented a tire fitting system for discriminating between Radio Frequency Identification, RFID, tags. The tire fitting system comprise a processing circuitry configured to detect an RFID tag, compare the identity of the RFID tag with a determined list of identities of RFID tags dedicated for a rim, or tire, of a wheel, and reject the RFID tag if its identity do not match with any of the identities in the determined list of RFID tags. In some embodiments, the processing circuitry may be further configured to register all RFID tags of rims, or tires, of wheels to be fitted by the tire fitting system in the list of identities of RFID tags dedicated for a rim, or a tire, of a wheel.

Figure 8:
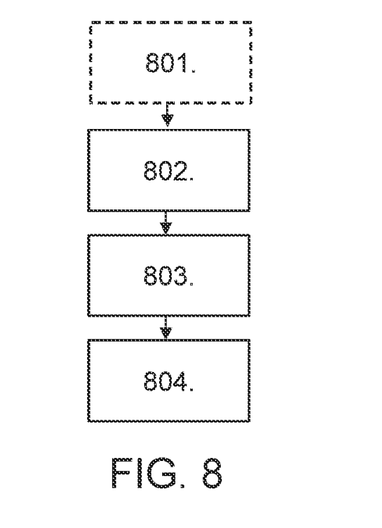
FIG. 8 is another flowchart illustrating embodiments of a method in a tire fitting system.

Examples of embodiments of a method performed by a tire fitting system 900 for discriminating between Radio Frequency Identification, RFID, tags, will now be described with reference to the flowchart depicted in FIG. 8. FIG. 8 is an illustrated example of actions, steps or operations which may be performed a tire fitting system 900 described above with reference to FIG. 9. The method may comprise the following actions, steps or operations.

Action 801. Optionally, the tire fitting system 400 may register all RFID tags of rims 114, or tires 113, of wheels 110 to be fitted by the tire fitting system 900 in a list of identities of RFID tags dedicated for a rim 114, or a tire 113, of a wheel 110. This may advantageously be performed as a rim or tire arrives in a tire fitment center or factory. According to another option, a registered list of identities of RFID tags dedicated for a rim, or tire, of a wheel may be made available to the tire fitting system. Here, the registered list may for example, be provided by the manufacturer of the rims and/or tires. The registered list may be registered and accessible via a memory, a database server, or cloud service.

Action 802 The tire fitting system 400 detects an RFID tag 931. This may, for example, be performed by the RFID scanner 901 in FIG. 9.

Action 803. After detecting the RFID tag 931 in Action 802, the tire fitting system 400 compares the identity of the RFID tag 931 with a registered list of identities of RFID tags dedicated for a rim 114, or a tire 113, of a wheel 110.

Action 804. After the comparison in Action 803, the tire fitting system 400 rejects the RFID tag 931 if its identity do not match with any of the identities in the registered list of RFID tags. This means that any RFID tag not listed in the registered list of RFID tags will be rejected by the tire fitting system. Hence, any confusion in the tire fitting system about which RFID tags to use is eliminated. This means that, as a tire is to be fitted on the rim of a wheel by the tire fitting system, the correct RFID tag will unambiguously be associated the wheel. Hence, the process of fitting wheels with a tire and properly associate its tire/rim sensors is improved.

Figure 9:
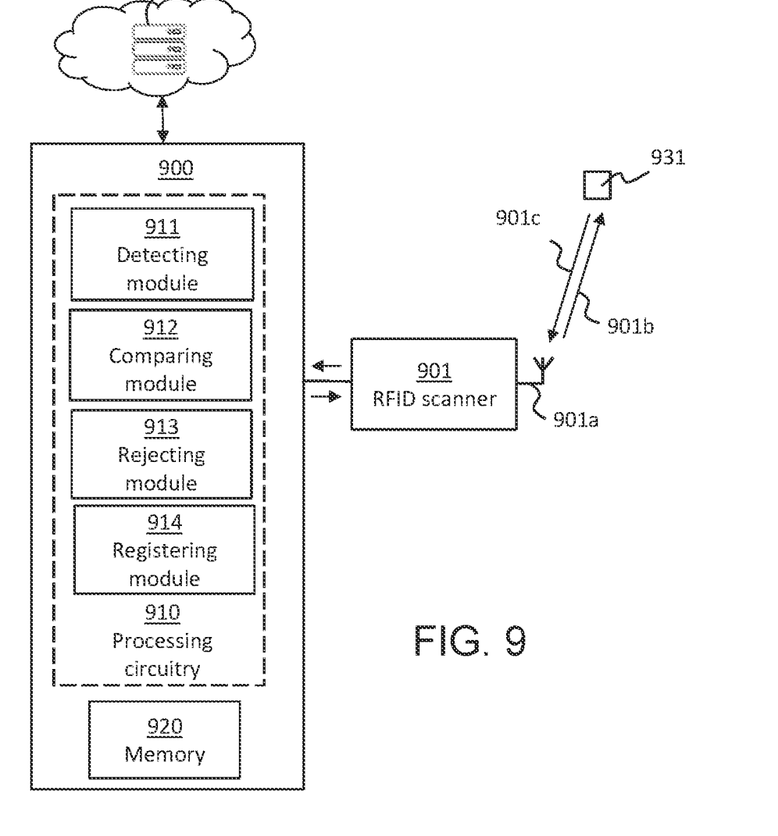
FIG. 9 is a further schematic illustration of a tire fitting system according to some embodiments.

FIG. 9 shows a schematic illustration of a tire fitting system 900 for discriminating between RFID tags 931 according to some embodiments. It should be noted that, although not shown in FIG. 9, known conventional features of the tire fitting system 900, such as, for example, a power source, e.g. a battery or main connection, may be assumed to be comprised in the tire fitting system 900.

The tire fitting system 900 may comprise, or be arranged to be connected to and configured to communicate with, an RFID scanner 901. The RFID scanner 901 may be configured to scan for RFID tags, such as, e.g. the RFID tag 931. The RFID scanner 901 may comprise an antenna 901a for transmitting and receiving RFID signals from RFID tags, such as, e.g. the RFID tag 931. The RFID signal may, for example, be an RFID interrogation signal and/or a generated electromagnetic field configured to trigger a RFID response from the RFID tag 931. The RFID tag may, for example, utilize the 868 MHz frequency band. For example, in FIG. 9, as the RFID tag 931 receives the RFID signal 901b from the RFID scanner 901, the RFID tag 931 will respond with a RFID response signal 901c comprising the identity of the RFID tag. In other words, the RFID scanner 901 may receive the RFID response signal 901c from the RFID tag 931 in response to the RFID tag 931 receiving its transmitted RFID signal 901b. According to some embodiments, the tire fitting system 400 may also comprise, or be arranged to be connected to and configured to communicate with, a database server or cloud service 908 in a connected or remote network 907.

The tire fitting system 900 further comprise a processing circuitry 910 and a memory 920. It should also be noted that some or all of the functionality described in the embodiments herein as being performed by the tire fitting system 900 may be provided by the processing circuitry 910 executing instructions stored on a computer-readable medium, such as, the memory 920 shown in FIG. 9. The processing circuitry 910 may be arranged to communicate with the RFID scanner 901. Furthermore, the processing circuitry 910 may further comprise additional components, such as, for example, a detecting module 911, a comparing module 912 and a rejecting module 913, each responsible for providing its functionality to support the embodiments described herein.

The tire fitting system 900 or processing circuitry 910 is configured to, or may comprise the detecting module 911 configured to, detect an RFID tag 931. Also, the tire fitting system 900 or processing circuitry 910 is configured to, or may comprise the receiving module 912 configured to, compare the identity of the RFID tag 931 with a registered list of identities of RFID tags dedicated for a rim 114, or a tire 113, of a wheel 110. The tire fitting system 900 or processing circuitry 910 is further configured to, or may comprise the rejecting module 912 configured to, reject the RFID tag 931 if its identity do not match with any of the identities in the registered list of RFID tags. In some embodiments, the tire fitting system 900 or processing circuitry 910 may be configured to, or may comprise the determining module 912 configured to, register all RFID tags of rims 114, or tires 113, of wheels 110 to be fitted by the tire fitting system 900 in a list of identities of RFID tags dedicated for a rim 114, or a tire 113, of a wheel 110.

Furthermore, the embodiments for discriminating between Radio Frequency Identification, RFID, tags described above may be at least partly implemented through one or more processors, such as, the processing circuitry 910 in the tire fitting system 900 depicted in FIG. 9, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 910 in the tire fitting system 900. The data carrier, or computer readable medium, may be one of an electronic signal, optical signal, radio signal or computer-readable storage medium. The computer program code may e.g. be provided as pure program code in the tire fitting system 900 or on a server and downloaded to the tire fitting system 900. Thus, it should be noted that the tire fitting system 900 may in some embodiments be implemented as computer programs stored in memory 920 in FIG. 9, e.g. the computer readable storage unit/module, for execution by processors or processing modules, e.g. the processing circuitry 910 in the tire fitting system 900 in FIG. 9.

Those skilled in the art will also appreciate that the processing circuitry 910 and the memory 920 described above may refer to a combination of analog and digital circuits, and/or one or more processors configured with software and/or firmware, e.g. stored in a computer readable storage unit/module, that when executed by the one or more processors such as the processing circuitry 910 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatuses, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

It should also be noted that the various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes. The embodiments herein are not limited to the above described preferred embodiments. Various alternatives, modifications and equivalents may be used. Therefore, the above embodiments should not be construed as limiting.

The invention claimed is:

1. A method performed by a tire fitting system for discriminating between at least two tire sensors of different wheels to be assembled on a vehicle, wherein the method comprises:
   receiving an identity of an Radio Frequency Identification, RFID, tag mounted on a rim, or in a tire, of a wheel;
   receiving, from the at least two tire sensors of different wheels, tire sensor signals comprising status information indicating how their respective tire sensor was activated; and
   determining which identity of the at least two tire sensors is to be associated with the identity of the RFID tag based on the status information.

2. The method according to claim 1, wherein the status information indicates that the at least two tire sensors was activated by an RF signal or by a pressure change in the tire of the wheel.

3. The method according to claim 1, wherein the determining further comprising determining which identity of the at least two tire sensors is to be associated with the identity of the RFID tag based on registered activation times of the at least two tire sensors.

4. The method according to claim 3, wherein an activation time is registered for a tire sensor when a tire sensor signal is received comprising status information indicating that the tire sensor was activated by a pressure change in the tire of the wheel.

5. The method according to claim 1, wherein the tire sensor signals from the tire sensor are radio signals using one or more of 315, 433, 868, 915 or 2450 MHz, the RF signal is a 125 kHz-signal, and the RFID tag utilizes a 868 MHz frequency.

6. A non-transitory computer program product comprising program code for performing the steps of claim 1 when said program code is run on a computer or on processing circuitry of a tire fitting system.

7. A non-transitory computer program carrier carrying a computer program according to claim 6, wherein the computer program carrier is a computer-readable storage medium.

8. A tire fitting system for discriminating between at least two tire sensors of different wheels to be assembled on a vehicle, wherein the tire fitting system comprise a processing circuitry configured to receive an identity of an Radio Frequency Identification, RFID, tag mounted on a rim, or in a tire, of a wheel, receive, from the at least two tire sensors of different wheels, tire sensor signals comprising status information indicating how their respective tire sensor was activated, and determine which identity of the at least two tire sensors is to be associated with the identity of the RFID tag based on the status information.

9. The tire fitting system according to claim 8, wherein the status information indicates that the at least two tire sensors was activated by an RF signal or by a pressure change in the tire of the wheel.

10. The tire fitting system according to claim 8, wherein the processing circuitry is further configured to determine which identity of the at least two tire sensors is to be associated with the identity of the RFID tag based on registered activation times of the at least two tire sensors.

11. The tire fitting system according to claim 8, wherein an activation time is registered for a tire sensor when a tire sensor signal is received comprising status information indicating that the tire sensor was activated by a pressure change in the tire of the wheel.

12. The tire fitting system according to claim 11, wherein the tire sensor signals from the tire sensor are radio signals using one or more of 315, 433, 868, 915 or 2450 MHz, the RF signal is a 125 kHz signal, and the RFID tag utilizes a 868 MHz frequency.

* * * * *